United States Patent
Bordes et al.

(10) Patent No.: US 11,297,323 B2
(45) Date of Patent: Apr. 5, 2022

(54) METHOD AND APPARATUS FOR COMBINED ADAPTIVE RESOLUTION AND INTERNAL BIT-DEPTH INCREASE CODING

(71) Applicant: INTERDIGITAL VC HOLDINGS, INC., Wilmington, DE (US)

(72) Inventors: Philippe Bordes, Cesson-sevigne (FR); Franck Galpin, Cesson-sevigne (FR); Pierre Andrivon, Cesson-sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/063,424

(22) PCT Filed: Dec. 20, 2016

(86) PCT No.: PCT/EP2016/081962
§ 371 (c)(1),
(2) Date: Jun. 18, 2018

(87) PCT Pub. No.: WO2017/108815
PCT Pub. Date: Jun. 29, 2017

(65) Prior Publication Data
US 2018/0376145 A1    Dec. 27, 2018

(30) Foreign Application Priority Data
Dec. 21, 2015    (EP) .................... 15307088

(51) Int. Cl.
*H04N 19/00*    (2014.01)
*H04N 19/132*    (2014.01)
(Continued)

(52) U.S. Cl.
CPC ......... *H04N 19/132* (2014.11); *H04N 19/105* (2014.11); *H04N 19/115* (2014.11);
(Continued)

(58) Field of Classification Search
CPC .. H04N 19/115; H04N 19/182; H04N 19/426; H04N 19/172; H04N 19/53;
(Continued)

(56) References Cited

U.S. PATENT DOCUMENTS 8,737,474 B2    5/2014    Gao et al.
8,953,673 B2    2/2015    Tu et al.
(Continued)

FOREIGN PATENT DOCUMENTS

| CN | 102857753 | 1/2013 |
| CN | 103283231 | 9/2013 |

(Continued)

OTHER PUBLICATIONS

Descampe et al., Coarse-To-Fine Textures Retrieval in the JPEG 2000 Compressed Domain for Fast Browsing of Large Image Databases, Multimedia Content Representation, Classification and Security, International Workshop, MRCS 2006, Proceedings (Lecture Notes in Computer Science vol. 4105).

(Continued)

*Primary Examiner* — Zhihan Zhou
(74) *Attorney, Agent, or Firm* — Ronald Kolczynski

(57) ABSTRACT

Images to be used as reference images in an adaptive resolution coder or decoder undergo resizing to match the resolution of an image being processed. The resizing process is carried out using extended resolution bit lengths to more accurately represent the processed image. The internal bit depth is retained through the resizing process, and kept as a reference image is stored. When a reference image is used in motion compensation processing, the resized reference matches the resolution of a current image being processed and has an expanded bit depth precision to achieve better fidelity.

22 Claims, 4 Drawing Sheets

(51) Int. Cl.
*H04N 19/43* (2014.01)
*H04N 19/172* (2014.01)
*H04N 19/53* (2014.01)
*H04N 19/156* (2014.01)
*H04N 19/105* (2014.01)
*H04N 19/115* (2014.01)
*H04N 19/182* (2014.01)
*H04N 19/426* (2014.01)

(52) U.S. Cl.
CPC ......... *H04N 19/156* (2014.11); *H04N 19/172* (2014.11); *H04N 19/182* (2014.11); *H04N 19/426* (2014.11); *H04N 19/43* (2014.11); *H04N 19/53* (2014.11); *H04N 19/428* (2014.11)

(58) Field of Classification Search
CPC .... H04N 19/156; H04N 19/428; H04N 19/43; H04N 19/132
See application file for complete search history.

(56) References Cited

U.S. PATENT DOCUMENTS

| | | | |
|---|---|---|---|
| 2005/0226335 A1* | 10/2005 | Lee | H04N 19/147 375/240.16 |
| 2012/0314026 A1* | 12/2012 | Chen | H04N 19/159 348/43 |
| 2013/0156311 A1 | 6/2013 | Choi et al. | |
| 2013/0287101 A1 | 10/2013 | Bordes et al. | |
| 2015/0103896 A1* | 4/2015 | Kim | H04N 19/33 375/240.12 |
| 2015/0201204 A1* | 7/2015 | Chen | H04N 19/30 375/240.02 |
| 2016/0124619 A1* | 5/2016 | McCallum | G06F 3/04845 345/619 |
| 2016/0316215 A1* | 10/2016 | Minoo | H04N 19/176 |

FOREIGN PATENT DOCUMENTS

| | | |
|---|---|---|
| CN | 105027567 | 11/2015 |
| GB | 2516424 | 1/2015 |
| WO | WO03034145 | 4/2003 |
| WO | WO2007114368 | 10/2007 |

OTHER PUBLICATIONS

Nguyen et al., Efficient Techniques for Depth Video Compression Using Weighted Mode Filtering, IEEE Transactions on Circuits and Systems for Video Technology, vol. 23, No. 2, pp. 189-202, Feb. 2013.

Chen et al., AHG8: Bit depth of output pictures, 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16 ), URL: http://wftp3.itu.int/av-arch/jctvc-site/,,No. JCTVC-G328,Nov. 9, 2011 (Nov. 9, 2011).

Davies (Cisco) T., Resolution switching for coding efficiency and error resilience, 6. JCT-VC Meeting; 97. MPEG Meeting;Jul. 14, 2011-Jul. 22, 2011; Torino; (Joint Collaborative Team on Video Coding of ISO/IEC JTC1/SC29/WG11 and ITU-T SG.16 ), URL: http:/wftp3.itu.int/av-arch/jctvc-site/,,No. JCTVC-F158, Jul. 1, 2011 (Jul. 1, 2011).

International Search Report dated Feb. 7, 2017.

* cited by examiner

METHOD AND APPARATUS FOR COMBINED ADAPTIVE RESOLUTION AND INTERNAL BIT-DEPTH INCREASE CODING

TECHNICAL FIELD

The present principles relate to adaptive resolution coding (ARC) of video images.

BACKGROUND

Recent deployment of Ultra High Definition (UHD) video content at formats of 3840×2048, and the forthcoming UHD-2 video format of 7680×4320p at 100/120 Hz has caused a need for video compression tools and systems that can manage such very high definition pictures.

In addition, the advent of Video on Demand (VOD) and Over the Top (OTT) applications, as well as an increase in video content exchanged through video streaming applications, Adaptive Resolution is foreseen as a new and challenging requirement of future video codecs.

Adaptive resolution coding in the High Definition Video Coding (HEVC) standard means adapting resolution dynamically in response to circumstances, without inserting Instantaneous Decoder Refresh (IDR) frames. Gains have been shown to be between 6.9-7.4% when using ARC compared to inserting an IDR frame. Some studies reported gains between 3-30%, depending on the original frame size and configuration, using one empirical resolution switch selection method.

In a real use case, resampling to reduced resolution has been used to facilitate sufficient coding efficiency in low bitrate applications. A first prior method reported an average Blu-ray Disc (BD) rate reduction of about 10% (up to 15%, 27.1%, and 19.4% in Y, U, V respectively) using 4K and 8K video content with a modified version of the HEVC reference software When Adaptive Resolution Coding is implemented in a video codec, two main issues may be encountered.

First is precision loss. The lack of precision in calculations performed during upsampling or downsampling operations performed during resizing to align the reference picture resolution with the current picture size introduces some losses. The upsampling and downsampling processes use additional rounding operations with potential loss of information that accumulates with the filtering and rounding operations of the Motion Compensation (MC) filters.

The second issue is an increase in memory requirements. The decoder picture buffer (DPB) can contain all possible resolutions, which can increase the decoder memory requirements.

Another prior approach has shown that one can reduce both of these limitations by combining resizing and motion compensation together. However, the combined resizing and motion compensation processing is obtained through the use of filters with increased number of taps that increases the calculation load and can reduce the benefits of this combined approach.

SUMMARY

These and other drawbacks and disadvantages of the prior art are addressed by the present principles, which are directed to a method and apparatus for combining Adaptive Resolution Coding and Adaptive Internal Bit Depth Increase.

The present principles comprise specifying an internal bit depth increase (IBDI) associated with potentially resized reference pictures, independent of the regular bit depth of the decoded and reconstructed pictures. The resized IBDI parameter can be adapted per picture or per region. An advantage of these principles is an improvement in video coding efficiency by increasing the precision of resized pictures when Adaptive Resolution Coding is used.

According to one aspect of the present principles, a method for adaptive resolution coding is provided. The method comprises resizing an image to be used as a reference picture, and increasing the bit depth of the resized image to a greater precision than before resizing. The method further comprises storing the resized, increased bit depth image, and performing motion compensation on a current image using the stored, resized image as a reference.

According to another aspect of the present principles, an apparatus for adaptive resolution coding is provided. The apparatus comprises a processor to resize an image to be used as a reference, and further comprises shift circuitry to increase the bit depth of the resized image to a greater precision than before resizing. The apparatus also comprises memory to store the resized, increased bit depth image, and motion compensation circuitry operating on a current image and using the stored, resized image as a reference.

In one advantageous embodiment, the previously mentioned method and apparatus are implemented in an encoder.

In another advantageous embodiment, the previously mentioned method and apparatus are implemented in a decoder.

In yet another advantageous embodiment, the previously mentioned method and apparatus are implemented using bit depth information signaled in a bitstream.

In yet another advantageous embodiment, the previously mentioned method and apparatus are implemented and an increase in bit depth of resized images is performed only for images of a particular resolution.

In yet another advantageous embodiment, the previously mentioned method and apparatus are implemented and an increase in bit depth is performed on a per picture basis.

In yet another advantageous embodiment, the previously mentioned method and apparatus are implemented and a bit depth of a reference image varies per region in the reference image.

DETAILED DESCRIPTION

Adaptive Resolution Coding (ARC) can lead to precision loss and memory increases. When reference pictures are resized to the format of a current picture size, rounding of mathematical operations can lead to loss of precision, which accumulates with filtering and motion compensation processes.

The embodiments described herein provide for use of increased bit depth precision in internal data paths, referred to as Internal bit Depth Increase (IBDI), resulting in better prediction, smaller residuals and better overall video quality. Resizing can, for example, be accomplished through a linear combination of 8-bit samples plus a final rounding, implemented with a right shift. One can adjust this right shift to obtain a desired output bit depth. Experimental results conducted with the HEVC reference software which codes eight bits of video content using internal 10-bit precision for reference frames showed significant BD rate improvement, although increasing decoder memory requirements.

Figure 1:
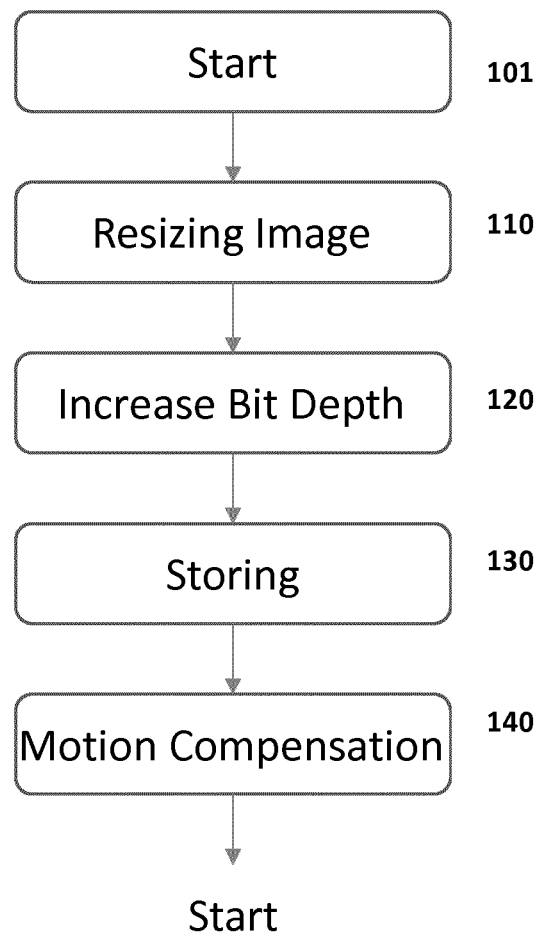
FIG. 1 shows one embodiment of an method using the present principles.

FIG. 1 shows one embodiment of a method 100 for adaptive resolution coding. The method commences at Start block 101 and proceeds to block 110 for resizing an image. Control then proceeds from block 110 to block 120 for increasing the bit depth of the resized image. Increasing the bit depth can be implemented by keeping more of the bits used in the mathematical process of resizing the image. Control proceeds from block 120 to block 130 for storing the resized, increased bit depth image. Control then proceeds from block 130 to block 140 for performing motion compensation on a current image, using the stored, resized, increased bit depth image as a reference to produce a motion compensated image.

Figure 2:
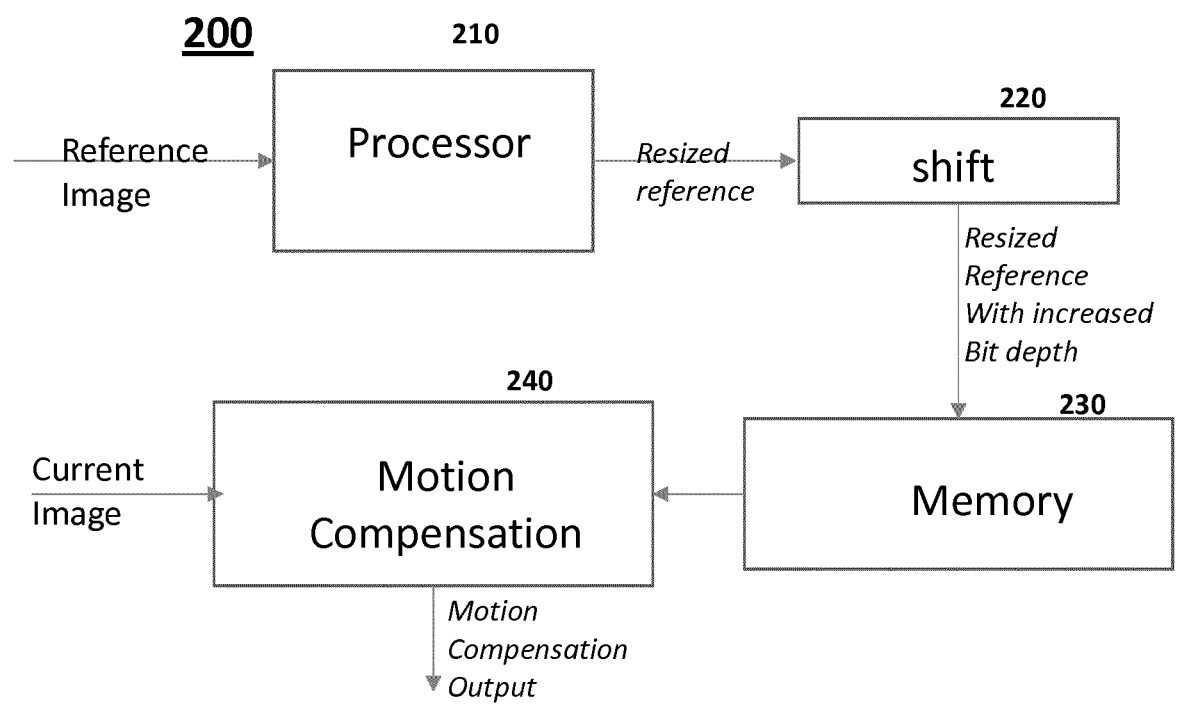
FIG. 2 shows one embodiment of an apparatus using the present principles.

FIG. 2 shows one embodiment of an apparatus 200 for adaptive resolution coding. The apparatus comprises a Processor 210 that receives a reference image on an input port. The Processor 210 is used to resize the image on its input port. The output of Processor 210 is in signal communication with the input of Shift circuit 220. Shift circuit 220 receives the resized image on its input and increases the bit depth of the image. The output of Shift circuit 220 is in signal connectivity with the input of Memory 230 that stores a resized, increased bit depth image that is later used as a reference. The output of Memory 230 is in signal connectivity with a first input of Motion Compensation circuit 240. The Motion Compensation circuit 240 also receives a current image on a second input port. The current image is processed along with the resized, increased bit depth reference image on Motion Compensation circuit 240's first input port to produce a motion compensation output on its output port.

The proposed embodiments combine the benefits of IBDI and ARC by storing resized resolution reference pictures with increased bit depth precision, while the other reference pictures use regular bit depth precision. This helps to alleviate the precision loss problem.

Another proposed embodiment allows the bit depth of reference pictures to vary dynamically. In case only low resolution reference pictures are stored with IBDI, this approach leverages the advantages of IBDI by increasing the efficiency of the ARC, while not obliterating the gains through increased decoder memory requirements. Keeping resized pictures that are upsampled at higher precision can increase memory bandwidth requirements significantly, so a tradeoff can be considered by using IBDI with downsampled references only. The efficiency of the ARC is increased because better precision would be achieved while upsampling a low resolution reference, for example. And, the overall decoder memory requirement is not changed, or is not increased systematically.

The resized reconstructed reference picture bit depth is signaled in the bitstream using, for example, Sequence Parameter Set (SPS), Picture Parameter Set (PPS), or slice headers. Resizing operations (both upsampling and downsampling) and motion compensation processes are adapted in the described embodiments by setting the final rounding and shift operations accordingly to achieve greater precision.

For the case when the bit depth of the resized reference pictures varies dynamically, bit depth information can also be sent dynamically. For example, one bit depth can be used for a particular reference picture, and another bit depth can be used for a second reference picture. However, one can, for example, encode a flag in the Sequence Header indicating that the bit depth of all of the resized pictures (or those of a particular resize ratio) is the same and encode its value. A decoder needs to know the bit depth of reference pictures in order to avoid drift errors in the reconstructed pictures that will use these reference pictures as prediction.

Figure 3:
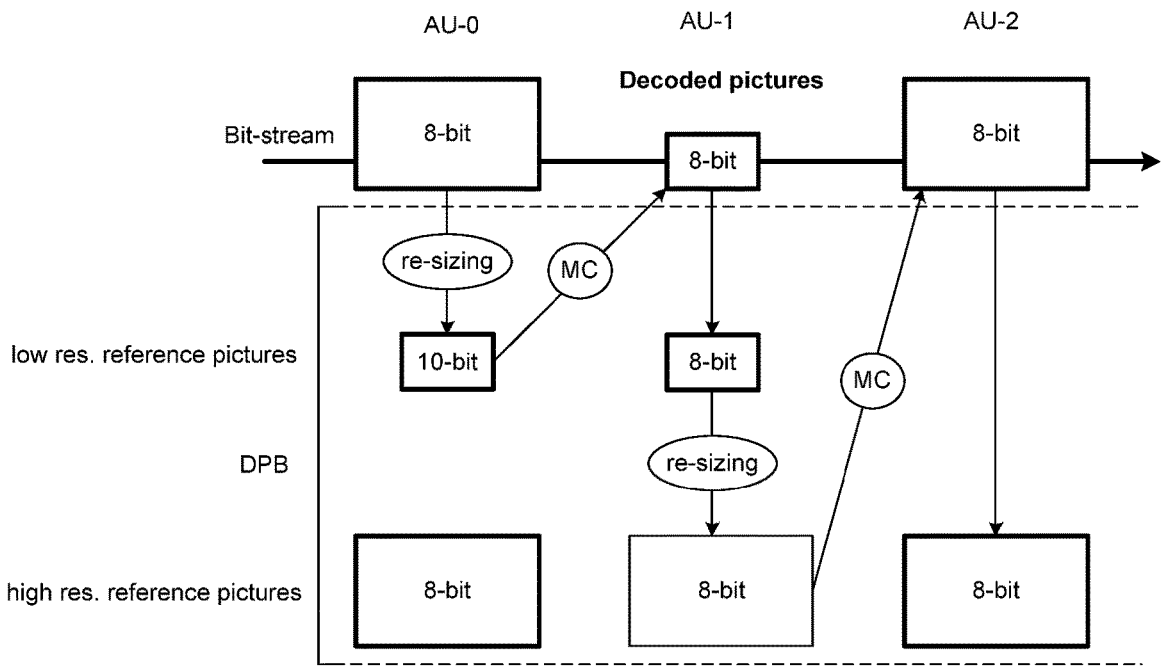
FIG. 3 shows one example embodiment of ARC and IBDI using the present principles.

One embodiment of the present principles is shown in FIG. 3, which depicts an example of combined ARC and IBDI. A resized downsampled reference picture corresponding to access unit AU-0 is output at 10-bit precision, while the regular bit depth is 8-bits. The higher precision, downsampled reference picture corresponding to AU-0 is available for motion compensation to the 8-bit smaller sized picture AU-1 from the Decoder Picture Buffer (DPB). The DPB stores both low resolution and high resolution reference pictures.

Figure 4:
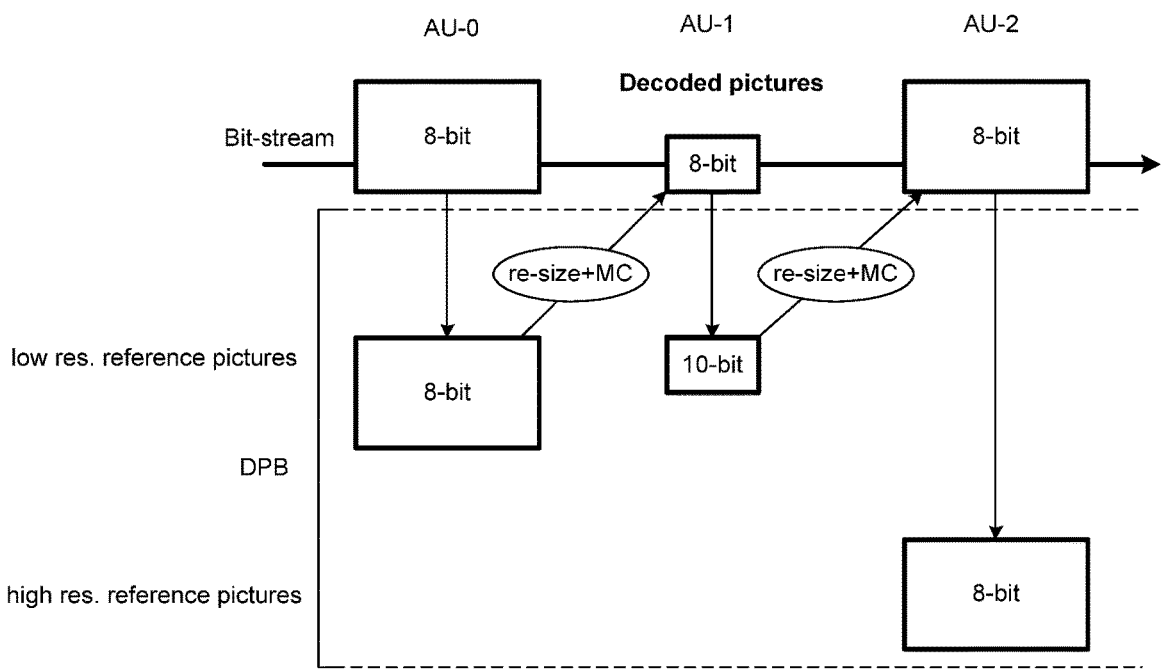
FIG. 4 shows one example embodiment of ARC single resolution and IBDI combination using the present principles.

Another embodiment of the present principles is shown in FIG. 4. In FIG. 4, the resizing operation is combined with motion compensation processing. The bandwidth memory is reduced while the precision is increased.

In another embodiment, an increase in bit depth of the resized pictures is performed for low resolution pictures only, in order to minimize the increase in memory bandwidth requirements. Examples of this scenario are in FIGS. 3, 4 and 6. However, this can concern all of the low resolution pictures, or merely some of them as illustrated. A low resolution picture can be relative to a format for a sequence of images being processed at another resolution. For example, if processing a signal of 7680×4320 format, low resolution can be a 1920×1024 format reference.

Figure 5:
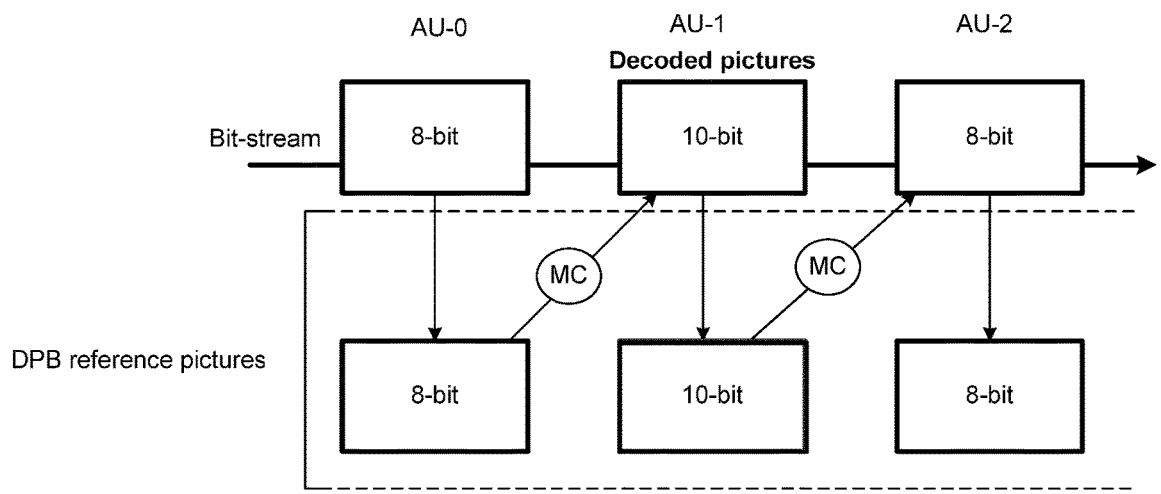
FIG. 5 shows an example embodiment of IBDI adaptive on a per picture basis using the present principles.
Figure 6:
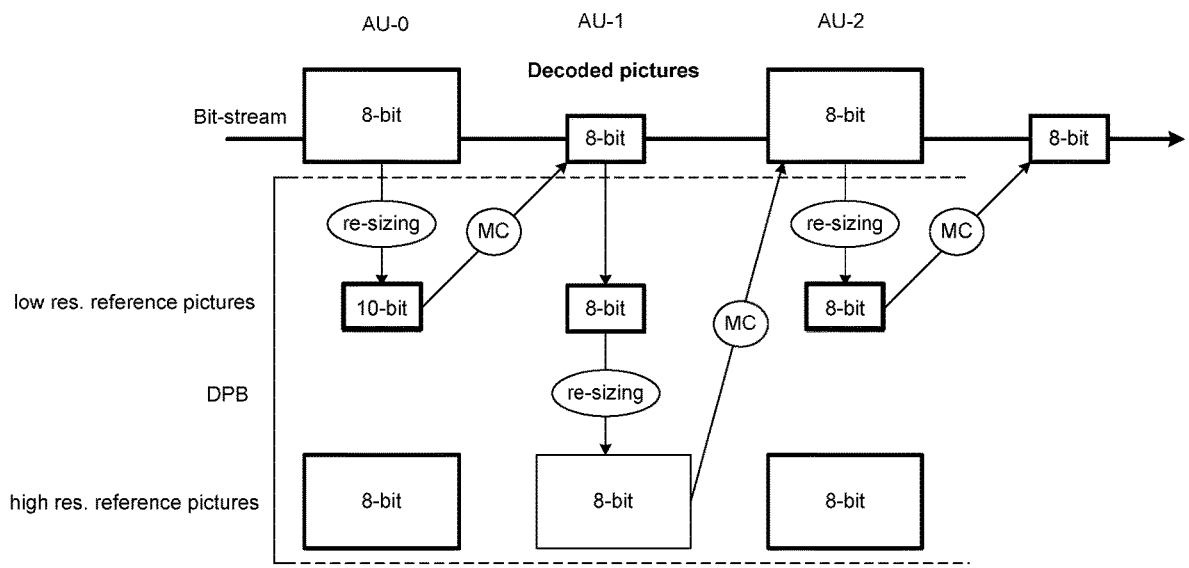
FIG. 6 shows an example embodiment of per picture adaptive IBDI with resolution change.

In another embodiment, an increase in bit depth is performed on a per picture basis, as shown in FIG. 6, even without resolution change, as depicted in FIG. 5. This allows for an increase in precision for key reference pictures, or those used frequently as reference pictures, for example.

In another embodiment, the bit depth of a reference picture can vary per region in a picture, such as per slice, for example. This embodiment can be used to save bandwidth memory if a lower IBDI is used, or to increase precision if a higher IBDI is used.

The aforementioned embodiments can be implemented in Set Top Boxes (STBs), modems, gateways or other devices that perform video encoding or decoding.

The functions of the various elements shown in the figures can be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method for adaptive resolution coding, comprising:
   resizing an image to be used as a reference picture;
   increasing the bit depth of the resized reference image to a greater precision than before resizing when the resizing is a downsampling, wherein an increase in bit depth is performed on a per picture basis and resized reconstructed reference picture bit depth is signaled in a bitstream, even without resolution change, and
   performing motion compensation on a current image of higher resolution and lower bit depth using the resized, increased bit depth image after upsampling to the resolution of the current image as a reference.

2. The method of claim 1, implemented by an encoder.

3. The method of claim 1, implemented by a decoder.

4. The method of claim 1, wherein bit depth information is signaled in a bitstream.

5. The method of claim 1, wherein an increase in bit depth of resized images is performed only for images of a particular resolution.

6. The method of claim 1, wherein an increase in bit depth is performed on a per picture basis.

7. The method of claim 1, wherein a bit depth of a reference image varies per region in the reference image.

8. The method of claim 1 further comprising encoding:
   a flag in the Sequence Header indicating that bit depth of resized pictures is equal and encoding said bit depth.

9. An apparatus for adaptive resolution coding, comprising:
   a processor to resize an image to be used as a reference;
   shift circuitry to increase the bit depth of the resized reference image to a greater precision than before resizing when the resizing is a downsampling, wherein an increase in bit depth is performed on a per picture basis and resized reconstructed reference picture bit depth is signaled in a bitstream, even without resolution change, and
   a motion compensator to perform motion compensation on a current image of higher resolution and lower bit depth using the resized, increased bit depth image after upsampling to the resolution of the current image as a reference.

10. The apparatus of claim 9, further comprising an encoder that includes the processor, the shift circuitry, and the motion compensator.

11. The apparatus of claim 9, further comprising a decoder that includes the processor, the shift circuitry, and the motion compensator.

12. The apparatus of claim 9, wherein an increase in bit depth of resized images is performed only for images of a particular resolution.

13. The apparatus of claim 9, wherein a bit depth of a reference image varies per region in the reference image.

14. The apparatus of claim 9, further comprising a processor that encodes:
   a flag in the Sequence Header indicating that bit depth of resized pictures is equal and encoding said bit depth.

15. A method for encoding a block in an image, comprising:
   resizing a reference block while performing motion compensation on a current block using the resized reference block;
   increasing the bit depth of the reference block to a greater precision than before resizing, wherein an increase in bit depth is performed on a per block basis, even without resolution change;
   storing the resized, motion compensated and increased bit depth reference block and,
   storing blocks from other reference pictures using an original bit depth precision.

16. The method of claim 15, wherein bit depth information is signaled in a bitstream.

17. An apparatus, for encoding a block in an image, comprising:

a processor to resize a reference block while performing motion compensation on the block using the resized reference block;

shift circuitry to increase the bit depth of the resized reference block to a greater precision than before resizing, wherein an increase in bit depth is performed on a per block basis, even without resolution change, and memory to store the resized, motion compensated and increased bit depth reference block and, to store blocks from other reference pictures using an original bit depth precision.

18. The apparatus of claim 17, wherein bit depth information is signaled in a bitstream.

19. A method for decoding, comprising:

resizing a reference block while performing motion compensation on a current block using the resized reference block;

increasing the bit depth of the reference block to a greater precision than before resizing, wherein an increase in bit depth is performed on a per block basis, even without resolution change;

storing the resized, motion compensated and increased bit depth reference block and, storing blocks from other reference pictures using an original bit depth precision.

20. The method of claim 19, wherein bit depth information is signaled in a bitstream.

21. An apparatus, for decoding a block in an image, comprising:

a processor to resize a reference block while performing motion compensation on the block using the resized reference block;

shift circuitry to increase the bit depth of the resized reference block to a greater precision than before resizing, wherein an increase in bit depth is performed on a per block basis, even without resolution change, and memory to store the resized, motion compensated and increased bit depth reference block and, to store blocks from other reference pictures using an original bit depth precision.

22. The apparatus of claim 21, wherein bit depth information is signaled in a bitstream.

\* \* \* \* \*